(12) United States Patent
Burk

(10) Patent No.: US 9,574,807 B2
(45) Date of Patent: Feb. 21, 2017

(54) THERMALLY DRIVEN CONDENSER UNIT AND ADSORPTION HEAT OR REFRIGERATION PLANT

(71) Applicant: MAHLE International GmbH, Stuttgart (DE)

(72) Inventor: Roland Burk, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 184 days.

(21) Appl. No.: 14/539,317

(22) Filed: Nov. 12, 2014

(65) Prior Publication Data
US 2015/0128638 A1 May 14, 2015

(30) Foreign Application Priority Data

Nov. 13, 2013 (DE) .................. 10 2013 223 066

(51) Int. Cl.
*F25B 39/04* (2006.01)
*F25B 35/04* (2006.01)
*F25B 17/08* (2006.01)
*F25B 27/02* (2006.01)

(52) U.S. Cl.
CPC .............. *F25B 39/04* (2013.01); *F25B 35/04* (2013.01); *F25B 17/08* (2013.01); *F25B 27/02* (2013.01); *Y02B 30/64* (2013.01)

(58) Field of Classification Search
CPC ........... F25B 35/04; F25B 27/02; F25B 17/08; Y02B 30/64
See application file for complete search history.

(56) References Cited

U.S. PATENT DOCUMENTS

| | | | | |
|---|---|---|---|---|
| 4,934,451 A | * | 6/1990 | Colvin | ................. F24F 1/0007 122/20 B |
| 5,319,943 A | * | 6/1994 | Bahel | .................... F24F 1/0003 62/156 |
| 8,806,883 B2 | | 8/2014 | Burk et al. | |
| 2004/0055369 A1 | * | 3/2004 | Lederer | ............. F02M 25/0809 73/114.41 |
| 2014/0223955 A1 | | 8/2014 | Schiehlen et al. | |

FOREIGN PATENT DOCUMENTS

| | | | |
|---|---|---|---|
| DE | 36 25 247 A1 | 2/1987 | |
| DE | 199 01 094 A1 | 7/2000 | |
| DE | 103 10 748 B3 | 8/2004 | |
| DE | 10 2004 049 411 A1 | 4/2006 | |
| DE | 102004049411 A1 * | 4/2006 | |
| DE | 10 2007 047 454 A1 | 4/2009 | |
| EP | DE102004049411 A1 * | 4/2006 | ............. F25B 35/04 |
| GB | 2 178 515 A | 2/1987 | |
| WO | WO 2007/068481 A1 | 6/2007 | |
| WO | WO 2013/011102 A1 | 1/2013 | |

* cited by examiner

*Primary Examiner* — Emmanuel Duke
(74) *Attorney, Agent, or Firm* — Muncy, Geissler, Olds & Lowe, P.C.

(57) ABSTRACT

A thermally driven condenser unit and an adsorption heat plant constructed therewith, which can be used as an adsorption heat pump, adsorption refrigeration plant, heat store and/or refrigeration storage mechanism. The thermally driven condenser unit integrates a thermal compressor and a condenser in a modular component.

10 Claims, 4 Drawing Sheets

THERMALLY DRIVEN CONDENSER UNIT AND ADSORPTION HEAT OR REFRIGERATION PLANT

This nonprovisional application claims priority to German Patent Application No. DE 10 2013 223 066.4, which was filed in Germany on Nov. 13, 2013, and which is herein incorporated by reference.

BACKGROUND OF THE INVENTION

Field of the Invention

The present invention relates to a thermally driven condenser unit and an adsorption heat or refrigeration plant.

Description of the Background Art

WO 2007/068481 A1, which corresponds to U.S. Pat. No. 8,806,883, which is incorporated herein by reference, describes an adsorption heat pump, having a plurality of hollow elements, each having an adsorption-desorption region and an evaporation-condensation region, i.e., a phase change region. The hollow elements have a heat transport fluid flowing through them in each of these regions, with cyclic changes by means of valve arrangements in the interconnection of the hollow elements with regard to the fluid flow. The plurality of hollow elements to be filled with a working medium may have the disadvantage of a high cost of installation.

WO 2013/011102 A1, which corresponds to US 20140223955, and which describes a concept of a sorption module, in which tube bundles arranged in a shared housing are arranged for transfer of the adsorption-desorption heat to an adsorber structure on the one hand and heat of condensation and evaporation to a phase change structure on the other hand, wherein the housing concept comprise a supporting structure which accommodates the pressure difference between the external atmospheric pressure and the vacuum prevailing in the working medium space.

A disadvantage in the conventional art is that in desorption of working media from the sorption zone, a portion of the working medium is condensed in cool locations of the housing wall and thereby lost for the subsequent evaporation. This lost condensate additionally cools the housing wall in re-evaporation, causing a cold surface in the next partial cycle with renewed condensation so that unwanted faulty condensation takes place there again. This is associated with a loss of power and efficiency. In addition, the possibility cannot be ruled out that in automotive applications, larger amounts of working media already condensed may be lost due to spillage because of vibration of the housing wall. Another disadvantage is the complex construction of the sorption module, the manufacture of which requires expensive tools.

One disadvantage of sorption modules known in the past having an integrated condensation and evaporation structure is the storage of refrigeration which has not previously been implemented. This requires an externally controllable fluid cutoff option between the condensation structure and the evaporation structure. Although this is a given with known approaches having separate condensers, nonreturn valves for the desorbed vapor are required for this purpose and must have an opening pressure, which is subject to loss, and a sufficient cross section for the vapor density of the working medium.

SUMMARY OF THE INVENTION

It is therefore an object of the present invention to provide a thermally driven condenser unit and an adsorption heat or refrigeration plant in which all the heat of condensation is made available for optional heating purposes and the amount of condensate for subsequent evaporation is made available to withdraw heat from a low temperature heat source and adsorption heat and/or evaporation refrigeration can optionally be stored almost without any loss.

An exemplary embodiment relates to a thermally driven condenser unit with a thermal compressor wherein the thermal compressor forms a modular component with a condenser. This modular thermally driven condenser unit combines the thermal compression of working media and the condensation in one module.

The thermal compressor advantageously has a housing which forms a fluid-tight working medium space in its interior, in which the thermal compressor designed as a sorption heat exchanger is arranged, and the sorption heat exchanger is connected to a first fluid guidance system, which is in turn connected thermally to an adsorber structure, the condenser being formed by a jacket, which surrounds the housing on the outside and has a second fluid guidance system for guiding the coolant and absorbing heat of condensation during a desorption phase of the adsorber structure. Due to the combination of a sorption heat exchanger with a thermally activated housing wall, all the loss mechanisms attributable to foreign condensation and subsequent evaporation of foreign media are prevented, so that the performance and efficiency of the heat pump or refrigeration system having this design are increased.

In an embodiment, the housing can be designed to be approximately cylindrical and is sealed at the bottom with a condensate collecting device that protrudes above the housing, thereby connecting a condensate drain line having a first nonreturn valve. Because of the cylindrical shape of the housing and of the jacket surrounding the housing, the condensate that is formed flows by gravity down the inside of the jacket, which is positioned largely vertically, and is collected by the condensate collecting device. The condensate collecting device may be designed here as a channel that is open at the top or as a ring channel. The condensate can then be drained out of the thermally driven condenser unit by means of the first nonreturn valve.

In a variant, the first nonreturn valve in the cross section and/or opening pressure can be designed so that a liquid working medium can pass through with a negligible pressure. In this context, "negligible" can mean that the saturation temperature of the liquid working medium drops only by few degrees Kelvin, for example, less than 5K, in passing through the first nonreturn valve. In the presence of gaseous working media, the valve cross section limits the volume flow due to the vapor pressure, which is reduced significantly. This first nonreturn valve thus functions as a supercooling control element.

In an embodiment, the condensate collecting device can be designed as a collecting channel having a gradient to the condensate drain line. This ensures that the condensate will run out of the thermally driven condenser unit without requiring any additional auxiliary component for conveyance of the condensate.

Alternatively, however, a pressure different may also be built up for displacement of the condensate by actively or passively cooling the liquid collector connected thereto. The saturated steam pressure of the condensate stored in the liquid collector is kept below the condensation pressure so that the condensate is drawn out of the condensate collection device even without auxiliary aids and, if necessary, also against the force of gravity, overcoming the opening pressure of the nonreturn valve.

In the following adsorption process, the nonreturn valve prevents the working medium from flowing back out of the liquid collector into the thermal compressor.

The nonreturn valve on the high pressure side may be designed to be much smaller and thus less expensive, which is advantageous in particular for the use of water as a working medium with its great density difference between liquid and gaseous phases.

A suction line connection designed with a second nonreturn valve can be arranged on the housing for suction intake of gaseous working medium. By means of this suction line connection, the working medium vapor is drawn in from an evaporator at the evaporation pressure level, for example, and then adsorbed in the adsorber structure with dissipation of the heat of adsorption. In the subsequent desorption and condensation with a pressure level that has been raised accordingly, this second nonreturn valve prevents the working medium vapor from being forced back into the evaporator.

In an embodiment, an intermediate space between the jacket and the housing has coolant flowing through it continuously in parallel to the axis of the cylindrical housing. Therefore, no fluid controller is necessary, which simplifies the dissipation of condensation heat.

In an embodiment, an inside surface of the jacket and/or of the condensate collecting device can be designed, so that only a small amount of liquid working medium remains in the working medium space when there is a pressure change between a condensation pressure and an evaporator pressure. This can be achieved by a geodetic arrangement of the functional components, for example, without requiring any additional aids.

A refinement of the invention relates to an adsorption heat or refrigeration plant, having at least one thermally driven condenser unit. In an adsorption heat or refrigeration plant, which may be designed as an adsorption heat pump or as an adsorption heat storage device and/or refrigerant storage device, the total condensation heat is thus available for optional heating purposes as well as the amount of condensation heat being available for the subsequent evaporation for removal of heat from a low temperature heat source when the condenser unit is designed according to the embodiments herein. In such a system, any number of condenser units may be installed and combined in an adsorption heat or refrigeration plant, so that the power and the storage capacity of the adsorption heat or refrigeration plant, for example a heat pump, can be easily adapted to existing requirements.

In one variant the at least one condenser unit can be connected to an evaporator unit, i.e., a condenserless unit, by means of a liquid line and a suction vapor line, wherein the evaporator unit combines in another module a liquid collector, an electrically controllable expansion valve and an evaporator for cooling a fluid in another module. For fluid connection of a plurality of condenser units, there are several possibilities to permit either high power densities or high COP values with efficient heat recovery. The condenser unit can be combined with various embodiments of an evaporator unit. Thus, for example, the evaporator may be used for cooling a coolant or may also be used for direct cooling of air.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
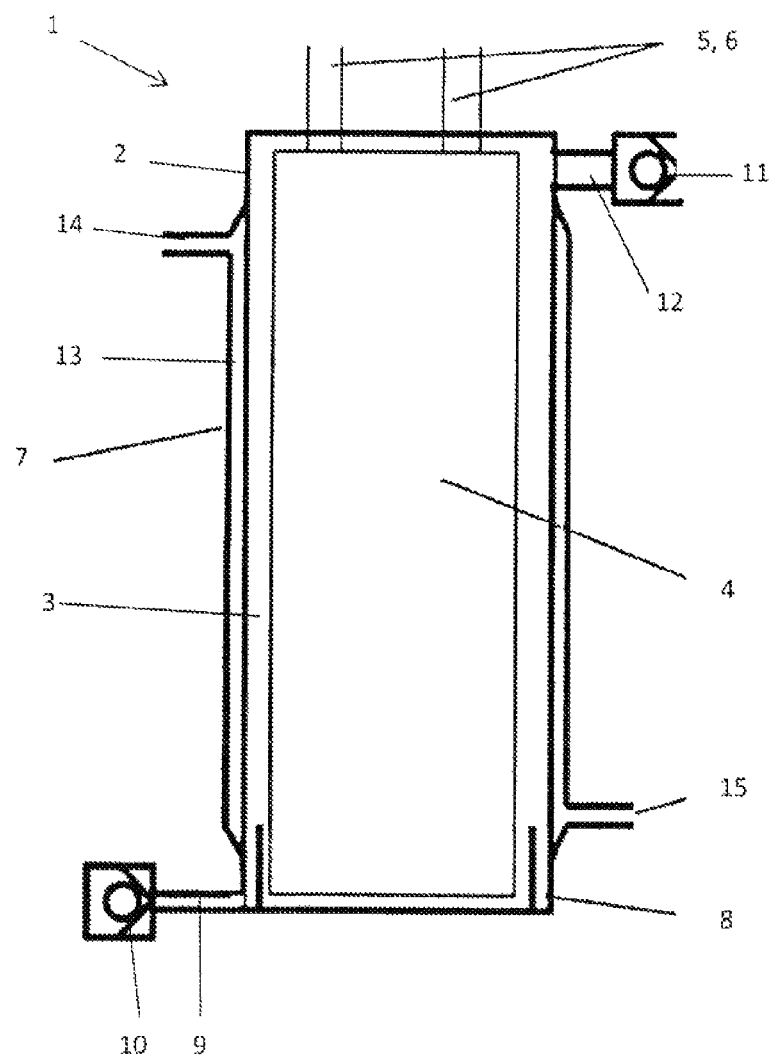
FIG. 1 shows an exemplary embodiment of a thermally driven condenser unit.

FIG. 1 shows an exemplary embodiment of the thermally driven condenser unit according to the invention. This condenser unit 1 is designed as a module having a housing 2, which forms a fluid-tight working medium space 3 in its interior. A sorption heat exchanger 4, which has fluid connections 5, 6, is arranged inside the working medium space 3. A fluid guidance system, which is in thermal contact with another adsorber structure (not shown), is formed by the fluid connections 5, 6. The sorption heat exchanger 4 may have a heating medium of varying temperature flowing through it by means of the at least one inlet 5 and the at least one outlet 6 of the fluid guidance system, resulting in thermal cycling of the adsorber structure. A pressure alternation within the working medium space 3 is caused by the resulting desorption and adsorption of the working medium.

The housing 2, which is designed to be cylindrical, is surrounded by a jacket 7 on the outside, which may be of any desired shape, but in the present case is also designed to be cylindrical according to the cylindrical housing 2 and, together with the latter, forms a fluid-tight intermediate space 13, through which fluid can flow. This is part of a second fluid guidance system which adsorbs the heat of condensation resulting from the flow of a coolant during the desorption phase of the adsorber structure on the inside wall of the housing 2 and thereby limits the pressure of the working medium during the desorption phase to the condensation pressure. The housing 2 has a condensate collecting device 8 on the inside of the lower end of the jacketed region. This condensate collecting device 8 is preferably designed as an annular channel for holding the condensate because the condensate that is formed runs down the inside of the housing 2, which is preferably designed to be vertical, and is collected by the condensate collecting device 8. The condensate is drained out of the condenser unit 1 to the outside through a condensate drain line 9 which has a nonreturn valve 10. In addition, a suction line connection 12 having a second nonreturn valve 11 is arranged on the housing 2 for suction intake of working medium vapor.

The cross section and opening pressure of the nonreturn valve 10, which is provided on the condensate collection device 8, is designed to allow a liquid working medium to pass through with a negligible pressure drop. "Negligible" can mean that the saturation temperature in passing through the nonreturn valve drops by only a few degrees Kelvin, preferably less than 5K. In the presence of gaseous working media, the valve cross section limits the volume flow because of the much lower vapor density. This nonreturn valve thus functions as a supercooling control element, which is similar to an orifice that has very little throttling and is known from compression refrigeration technology.

An intermediate space 13 between the jacket 7 and the housing 2 is supplied with a condensation heat medium, which is introduced into the intermediate space 13 through a condensation heat medium inlet 14 situated at the top of the housing 2 and is discharged from the intermediate space 13 through a condensation heat medium outlet 15 formed diagonally on the opposite side of the jacket 7. The condensation heat medium thus flows through the condenser unit 1, from top to bottom in the present embodiment, essentially parallel to the cylindrical housing 2.

The walls of the jacket 7 of the condenser unit 1 have flow through them constantly in parallel for dissipation of the heat of condensation without a fluid controller. In addition, the internal surface of the housing 2 and/or of the condensate collecting device 8 is designed so that in the event of a pressure change between the condensation pressure and the evaporation pressure only a negligible amount of liquid working medium or none at all remains in the working medium space 3 and the condensate collecting device 8, which is achieved by a geodetic arrangement of the functional components for example. This is achieved through the structuring and/or coating of the inside of the housing 2 and the condensate collecting device 8.

Figure 2:
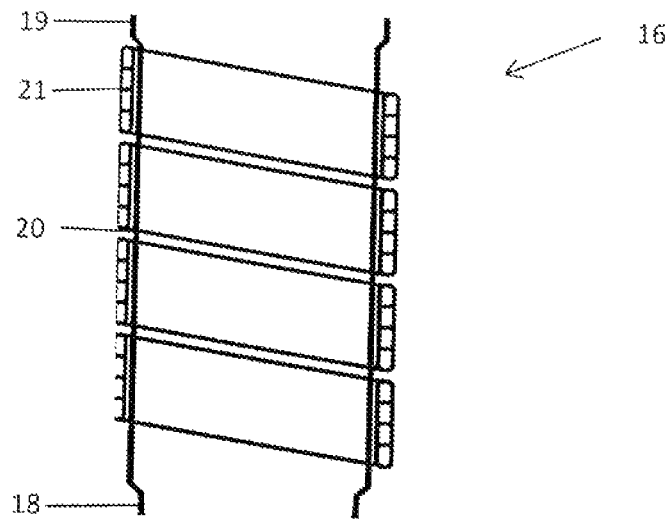
FIG. 2 shows an exemplary embodiment of a jacketed tube of the condenser unit according to the invention, as shown in FIG. 1.
Figure 3:
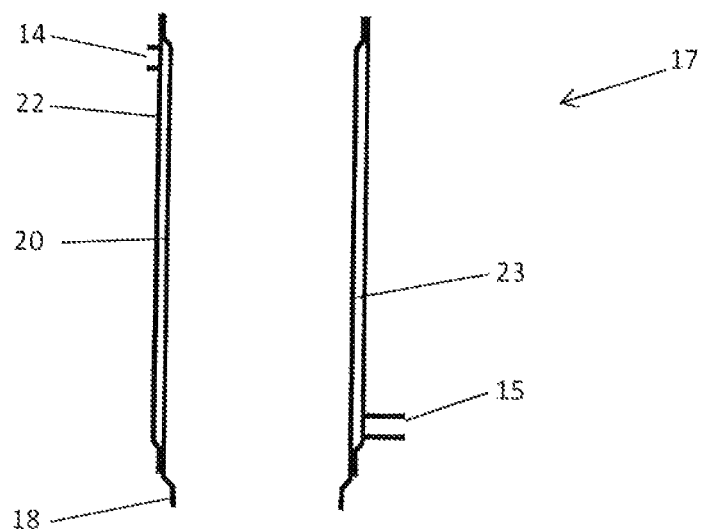
FIG. 3 shows an exemplary embodiment of a jacketed tube of a liquefier wet according to FIG. 1.

FIGS. 2 and 3 show embodiments of a jacketed tube 16 and 17, respectively, which combine both the housing 2 and the jacket 7 at the same time and form a structural unit. Each jacketed tube 16, 17 is formed of a simple, preferably cylindrical, metal tube, which tapers at one end 18 and widens at its other end 19. This jacketed tube 16, 17 may also be equipped with one or more peripheral ring or spiral grooves, for example, in an IHU or circulating process to allow a change in longitudinal expansion and to ensure stabilization of the peripheral shape, preferably circular.

FIG. 2 shows the inner jacketed tube 20, preferably made of steel or stainless steel and having at least one flat tube coil 21 coiled around it, connected to the outer jacketed tube 22 with a heat-conducting connection, e.g., by means of a heat-conducting adhesive. The embodiment according to FIG. 2 combines components that are available inexpensively in the form of a stainless steel tube, which has been reshaped only slightly, preferably as a cylindrical housing jacket, having a multichamber flat tube, which can be made of extruded aluminum, for example, and shaped into a flat tube coil 21. Other embodiments of this basic principle of the combination of at tube coil with a jacketed tube are also conceivable.

In the exemplary embodiment of the jacketed tube 17 according to FIG. 3, an annular gap 23 through which coolant can flow is formed with another exterior jacketed tube 22 having a matching diameter at the end, forming an annular gap with the interior jacketed tube 20. This annular gap 23 may be equipped with spacers (not shown) such as webs, nubs, beading or folds, preferably created by shaping techniques, to create a defined through-flow and stabilization of the cross section, which is preferably circular. The interior and exterior jacketed tubes 20, 22 are physically bonded together preferably by welding, in particular laser welding, on at least one end. Spacers (not shown further) can also ensure that a defined forced flow is induced through the annular gap 23 with particularly homogeneous thermal regulation of the jacketed tube 17. A spiral flow similar to that of the embodiment according to FIG. 2 is particularly advantageous.

The lateral surfaces of the jacketed tubes 21, 22, which are thermally activated by means of fluid flow agents, in addition to dissipating the heat of condensation from the wall of the jacket, also serve at the same time to stabilize the preferably circular cross section, which is particularly stable with respect to varying pressure differences between the inside and outside.

The second embodiment according to FIG. 3, having two cylinders inserted one into the other, produces an even more direct thermal contact between the coolant and the lateral surface of the interior jacketed tube 20 by eliminating the adhesive layer and the thickness of one tube wall.

Figure 4:
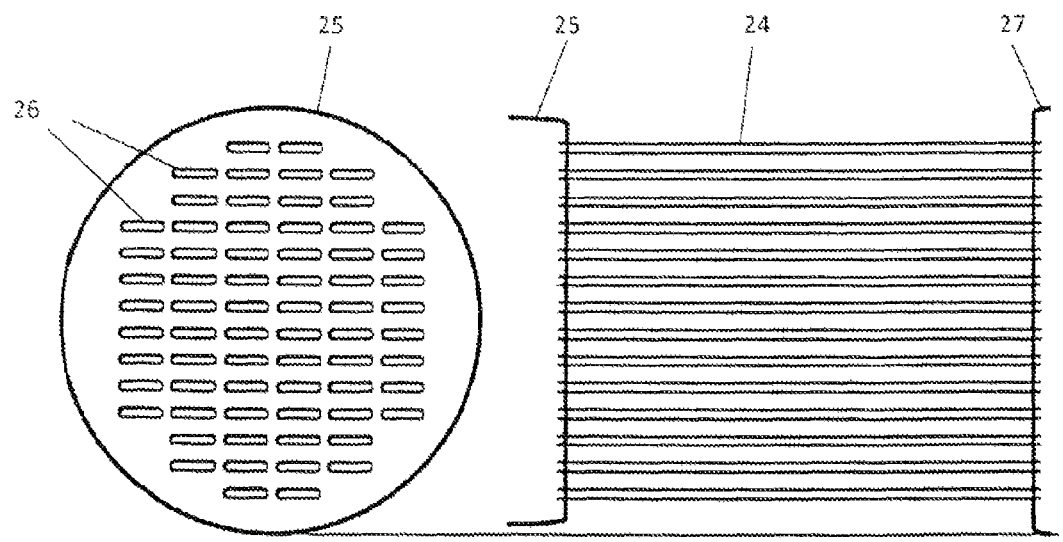
FIG. 4 shows an exemplary embodiment of the tube bundle of a sorption heat exchanger.

For closure of the end faces of the jacketed tubes 16, 17 of the working medium space 3, deep-drawn or otherwise shaped metallic tube sheets 25, 27 may be used, wherein fluid passages to the interior sorption heat exchanger 24 are provided on at least one tube sheet 25, 27. A preferred exemplary embodiment of such a sorption heat exchanger 24 is shown in FIG. 4. The tube bundle 26 can be connected with a vacuum-tight seal to two differently shaped tube sheets 25 and 27 by a physically bonded joining technique such as laser welding at one end. The tube sheets 25, 27 are of such dimensions that the entire submodule of the cassetted tube bundle 26 is inserted into the jacketed tube 16 and/or 17 and connected to it for a vacuum-tight housing. To do so, the smaller tube sheet 25 is adapted to the diameter of the tapered end 18 of the jacketed tube 16, and the larger tube sheet 27 is adapted to the diameter of the widened end 19 of the jacketed tube 16. As shown in FIG. 4, the smaller tube sheet 25 has a higher edge, which, in the condition of being joined to the jacketed tube 16 and/or 17, results in formation the annular channel 8 between the jacketed tube 16 and/or 17 and the tube sheet 25. With a vertical position of the cylindrical condenser unit 1, the condensate running down the inside wall of the jacketed tube 16 is collected and can be drained to the outside through the condensate drain line 9 and the first nonreturn valve 10 arranged therein.

Figure 5:
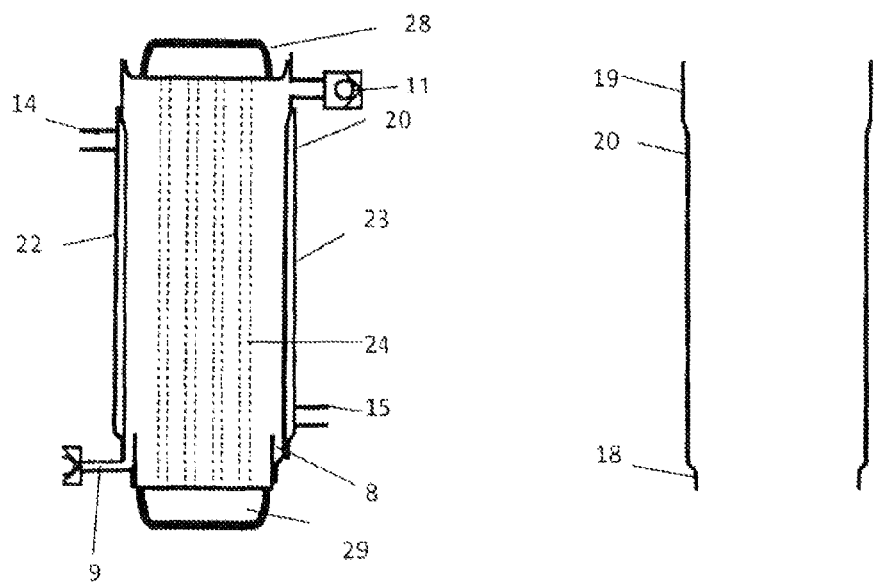
FIG. 5 shows an exemplary embodiment of a thermally driven condenser unit.

FIG. 5 shows the assembly of the condenser unit described here, which is supplemented with water tanks 28, 29 to complete the sorption heat exchanger 24, these water tanks being connected to the tube sheets 25, 27 in a fluid-tight connection on the outside with a seal and with techniques that are not explained further here.

In this embodiment, the condensate collecting device 8 can be decoupled thermally from the sorption heat exchanger 4 due to the distance between the regions 8 and 29, which are thermally regulated at different temperatures, to minimize a harmful heat flow from the sorption heat exchanger 4 to the condensation region 23 and the condensate collecting device 8.

The diagram on the right shows again the internal jacketed tube 20, which is tapered or widened in steps at the end for gap-free accommodation of the tube sheets 25, 27 according to FIG. 4. The tubes of the tube bundles 26 have an adsorber structure on the outside, which has good thermal contact but is not shown here further and can be cycled thermally between two temperature limits by means of a thermally regulated heating medium, which is variable over time. To accommodate differences in thermomechanical expansion and/or stresses, the tube sheets 25, 27 are embodied as so-called diaphragm sheets and/or cylinder jackets having an expansion beading.

The components described here work as thermally driven condenser unit 1 in which an alternation in pressure from evaporation pressure to condensation pressure is implemented first. This takes place by having the heating medium flow through the sorption heat exchanger 24 at a progressively higher temperature. Due to the associated increase in pressure, the second nonreturn valve 11 on the intake end closes first.

Additionally, the task of desorption and condensation is fulfilled by the condenser unit 1. This takes place in that the sorption heat exchanger 24 has further flow through it by means of a hot heating medium wherein working medium is desorbed at a high pressure. The high pressure keeps the nonreturn valve 11 on the intake end closed. The working medium condenses on the cooled wall of the internal jacketed tube 20 and runs down the wall into the annular channel 8 described above, where it exits from the working medium space 3 through a nonreturn valve 10 designed for the liquid phase and preferably enters a liquid collector (not shown here). When the collecting device is empty, an additional outflow of working medium vapor into the actively or passively cooled liquid collector is largely prevented, so that the condensation pressure and the liquid supercooling are regulated at levels close to the boiling point.

In addition, the components described here permit a pressure alternation of condensation pressure to vapor pressure. To do so, the temperature of the heating medium flowing through the sorption heat exchanger 24 is reduced progressively. Due to the associated pressure reduction, the condensation comes to a standstill and the nonreturn valve 10 on the fluid end closes. On reaching the evaporation pressure, the second nonreturn valve 11 in the intake line 12 opens.

As an additional function of the condenser unit, the vapor suction and adsorption are performed. The sorption heat exchanger 4, 24 has additional flow through it by means of the recooled heat exchanger, wherein working medium evaporated in an evaporator is drawn in and absorbed at a low pressure.

Figure 6:
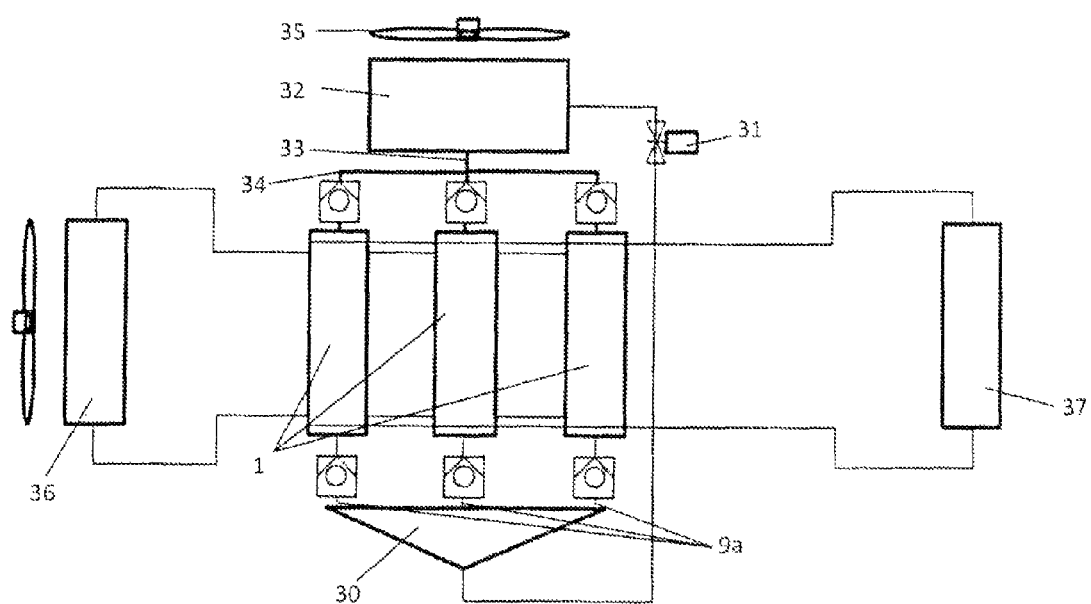
FIG. 6 shows an exemplary embodiment of an adsorption heat pump and/or a refrigeration and heat storage device.

The condenser unit described here is a module, which can be combined with any number of other condenser units. Based on the thermally driven condenser unit 1 shown here, a modular thermally driven heat pump or a refrigeration plant with optionally combined heat and/or refrigeration storage function can be constructed as follows. In the present case, three condenser units 1 are connected to the liquid collector 30 in FIG. 6. This number may be varied, however, depending on the application case. This liquid collector 30 is connected to an evaporator 32 via an expansion valve 31 that can be cut off and/or pulse width modulated, the suction line 33 of the evaporator being connected to the suction connection 34 of the three condenser units 1. In the present variant, the evaporator 32 has air flowing through it by means of a fan 35. Alternatively, however, the evaporator 32 may also be embodied as a condenser.

The components which complete the thermally driven condenser unit 1 thus include the liquid collector 30, the electrically controllable, preferably pulse-width-modulated expansion valve 31 and the evaporator 32 for cooling a fluid. The plant presented here, which is arranged between a heat sink 36 and heat source 37, fulfills various functions. The plant may be used for heating purposes, for example, as a thermally driven heat pump. A fuel heater, a caloric device or the like, for example, may be used for high-temperature heat. The heat sink 36 represents the object to be heated for example a building, a room or a vehicle cab, where the heat of adsorption and the heat of condensation are emitted at a moderate temperature level. Low-temperature heat from the environment for example from the outside air, from a ground probe or a solar collector is observed in the evaporator 32.

In addition, use as a thermally driven refrigeration plant is also possible. Waste heat or excess heat from any processes or plants or heat from a fuel heater is then used as the high temperature heat. The environment is used as the heat sink, where the adsorption heat and condensation heat are dissipated. Low temperature heat is absorbed directly or indirectly in the evaporator from an object or a room to be cooled, thereby cooling the later.

In addition, use as an adsorption heat or refrigeration storage mechanism is also possible. When the externally controllable expansion valve 31 is closed, refrigeration energy can be accumulated and stored by desorbing one or more condenser unit modules and storing the resulting condensate in a liquid collector 30, which is designed with a capacity of such dimensions that it can hold the total amount of working medium of all condenser units 1. Then at least one, preferably all, of the condenser units are brought to the temperature of recooling, so that determination of a high refrigeration power is prepared. When there is a demand for refrigeration, the expansion valve 31 is opened or is cycled in the pulse width modulation method so that the desired evaporation power is released. Due to the working medium vapor taken in by the modules and adsorbed, these modules heat up and release adsorption heat which can then be used to preheat a motor or the like for example. Before discharge of the stored heat and refrigeration energy, desorption of the first condenser unit 1 may be initiated to adjust the steady-state refrigeration power.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A thermally driven condenser unit comprising:
   a thermal compressor, and
   a condenser,
   wherein the thermal compressor forms a modular component with the condenser,
   wherein the thermal compressor comprises a housing that forms a fluid-tight working medium space in an interior thereof and a sorption heat exchanger arranged in the housing,
   wherein the sorption heat exchanger is connected to a first fluid guidance system that is thermally connected to an adsorber structure,
   wherein the condenser is a jacket which surrounds the housing on an exterior and has a second fluid guidance system for guiding a coolant and absorbing the heat of condensation during a desorption phase of the absorber structure, and
   wherein the second fluid guidance system includes a condensation heat medium inlet provided at a position corresponding to an upper end of the housing and a condensation heat medium outlet provided at a position corresponding to a bottom end of the housing diagonally opposite to the position of the condensation heat medium inlet.

2. The thermally driven condenser unit according to claim 1, wherein the housing is designed to be approximately cylindrical and is sealed at a bottom with a condensate collecting device, which protrudes beyond the housing, and wherein a condensate drain line comprising a first nonreturn valve is connected to the condensate collecting device.

3. The thermally driven condenser unit according to claim 2, wherein the first nonreturn valve is designed with regard to a cross section and an opening pressure thereof, so that a liquid working medium passes through at a negligible pressure drop.

4. The thermally driven condenser unit according to claim 2, wherein the condensate collecting device is a collecting chute forming a gradient to the condensate drain line.

5. The thermally driven condenser unit according to claim 2, wherein a suction line connection for suction intake of gaseous working media is formed with a second nonreturn valve on the housing.

6. The thermally driven condenser unit according to claim 1, wherein an intermediate space between the jacket and housing has a coolant flowing through it continuously in parallel with the axis of the cylindrical housing and wherein the intermediate space forms part of the second fluid guidance system.

7. The thermally driven condenser unit according to claim 1, wherein at least one of an inside surface of the jacket or an inside surface of the condensate collecting device is designed so that, when there is a change in pressure change between a condensation pressure and an evaporator pressure, very little liquid working medium remains in the working medium space.

8. An adsorption heat or refrigeration plant comprising at least one thermally driven condenser unit, wherein the at least one thermally driven condenser unit is formed according to claim 1.

9. The adsorption heat or refrigeration plant according to claim 8, wherein the at least one thermally driven condenser unit is connected to an evaporator unit via a liquid line and a suction vapor line is connected to the evaporator unit which combines a liquid collector, an electrically controllable expansion valve, and an evaporator for cooling a fluid in another module.

10. The thermally driven condenser unit according to claim 1, wherein an exterior surface of the jacket forms the outermost surface of the thermally driven condenser unit.

* * * * *